United States Patent Office 3,437,555
Patented Apr. 8, 1969

3,437,555
COMPOSITION FOR RENDERING PAPER FORGERY-PROOF AND FORMING PAPER THEREWITH
Joseph Gessner, Woodstown, N.J., assignor to E. I. du Pont de Nemours and Company, Wilmington, Del., a Corporation of Delaware
No Drawing. Filed Dec. 3, 1965, Ser. No. 511,363
Int. Cl. D21h 5/10
U.S. Cl. 162—140                          6 Claims

ABSTRACT OF THE DISCLOSURE

A storage-stable, aqueous solution of 2-amino-6-benzothioazole carboxylic acid, useful for rendering paper forgery-proof, consisting essentially of 5 to 20 weight percent of said acid and a sufficient quantity, at least two moles per mole of acid, of a mono-, di- or trialkonalamine, for example, ethanolamine, diethanolamine or triethanolamine, to effect dissolution of said acid.

---

This invention is directed to a new composition of matter for rendering paper forgery-proof or more particularly to a concentrated aqueous solution of 2-amino-6-benzothiazolecarboxylic acid containing a lower alkanolamine as a solublizing and stabilizing agent.

Amino-arylthiazoles have long been recognized as being adapted for rendering paper treated with them sensitive to ink eradicating chemicals and thus useful for imparting forgery-proofness to paper (U.S.P. 2,061,632). Among compounds of this class is 2-amino-6-benzothiazolecarboxylic acid which has been preferred in commercial use of an agent of this kind. This compound is essentially insoluble in water even at elevated temperatures. It is also insoluble in lower alcohols. Solubility in the alcohols is desirable for application of the compound to paper by printing.

Heretofore, the common method of taking 2-amino-6-benzothiazolecarboxylic acid into solution has been to stir the dry, powdered material into an aqueous ammonia solution at an elevated temperature. The upper limit of concentration of this organic acid in such a solution is about five percent by weight. The solution is preferably kept hot to keep the solute in solution, and the container must be kept closed to avoid loss of ammonia with resultant precipitation of the material. If a five percent ammonia solution cools to room temperature, it must be stirred and heated before use to provide a satisfactory working solution. Solution of the aminobenzothiazolecarboxylic acid sodium or potassium hydroxide is not acceptable because the application of such a salt solution to paper leaves an alkaline residue which renders the paper hydroscopic and unfit for use except in an extremely dry atmosphere. Sodium and potassium hydroxides also make the paper too absorbent for writing and printing purposes.

It is, therefore, an object of this invention to provide an improved aqueous solution of 2-amino-6-benzothiazolecarboxylic acid. Another object it to provide an aqueous solution of 2-amino-6-benzothiazolecarboxylic acid of at least 15% concentration and characterized by being stable in storage and readily diluted by water, a lower aliphatic alcohol, or mixture of water and alcohol to form workable dilute solutions.

These and other objects of the invention will be apparent from the following description and claims.

More specifically, the present invention is directed to a composition of matter for rendering paper forgery-proof consisting essentially of a concentrated aqueous solution of 2-amino-6-benzothiazolecarboxylic acid and an alkanolamine, said composition being adapted to be diluted with water, a lower aliphatic alcohol, or mixture of water and the alcohol, said alkanolamine having the formula

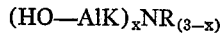

$$(HO-AlK)_xNR_{(3-x)}$$

wherein AlK is an alkylene radical of two to four carbon atoms, R is hydrogen or alkyl of one to three carbon atoms, and x is an integer from one to three, said 2-amino-6-benzothiazolecarboxylic acid being present in an amount from 5% to 20% by weight of the entire solution and said alkanolamine being present in an amount sufficient to effect dissolution of the acid but not less than two moles per mole of the acid. A preferred composition of this invention is one wherein the alkanolamine is an ethanolamine; specifically, triethanolamine is a preferred species.

This invention also encompasses a process of treating paper to render it forgery-proof which consists of diluting the invention composition with water, a lower aliphatic alcohol, or mixture of water and alcohol and applying the resultant solution to paper as a surface coating or by printing or by addition to pulp in the beater prior to formation of the paper.

The invention composition is used for the protection of valuable documents and papers against forgery by placing in or on the paper a chemical which produces a brown stain when brought into contact with chlorine or chlorine-containing ink eradicators. The active ingredient is 2-amino-6-benzothiazolecarboxylic acid which is taken in the form of a dry powder or preferably as a wet press cake in manufacture for the preparation of a concentrated aqueous solution containing an alkanolamine. The solution may vary from about 5% by weight of active ingredient to as much as 20%; obviously, the more concentrated is the solution, the less the amount of water which must be transported.

Per se, 2-amino-6-benzothiazolecarboxylic acid is water insoluble, but it has been discovered that stable, useful and economical solutions of high concentration can be produced by having present in the water a lower alkanolamine of the above formula. An alkanolamine suitable for this purpose is such a compound as monoethanolamine, diethanolamine, triethanolamine, a mono-, di- or tri-propanolamine (normal or iso), the corresponding butanolamine (normal, iso or tertiary; mono-, di- or tri)- N,N - dimethylethanolamine, N,N - diethylethanolamine, N,N - diisopropylethanolamine, N-methyldiethanolamine or a mixture of any of the foregoing alkanolamines. Solution is readily effected by stiring the 2-amino-6-benzothiazolecarboxylic acid powder or paste in water containing at least two moles of the alkanolamine per mole of the organic acid. Heating to from about 50° C. to about 80° C. aids the dissolving process. On cooling to room temperature, the resulting solution is found to be clear and is stable on standing for an extended time.

In the preparation of paper treatment solutions the concentrated solution is diluted to a content of active ingredient of 2% to 1% and lower by weight with water, a lower aliphatic alcohol of one to three carbon atoms such as methanol, ethanol or isopropanol, or a mixture of water and alcohol such as 50:50 or any other proportion of each component. The solution so diluted is used for printing lines, designs, or words such as "altered," "void," or "fraud" on the surface of paper. The printed pattern will appear in a brown color when a chlorine-containing eradicator is applied. The paper may be surface coated with the dilute solution in a size press or by padding. If desired, pulp may be treated in the beater or head box with the concentrated or a diluted solution of the invention composition to provide a given amount, say 0.5% by weight, of active ingredient on the basis of the weight of the dry fiber. Thus the finished paper bears throughout its volume a chemical to indicate any subsequent use of chlorine-containing ink removers.

Representative examples further illustrating the invention follow:

EXAMPLE 1

Twenty parts by weight of a wet press cake of 2-amino-6-benzothiazolecarboxylic acid containing 30% active ingredient were mixed with 20 parts by weight of triethanolamine (about 4.3 moles per mole of the carboxylic acid) until a clear uniform solution was obtained with heating to 70° C. This procedure provided a solution containing 15% active ingredient which solution remained clear on cooling to room temperature and with prolonged standing.

A portion of the resultant solution was diluted with water to provide a solution containing 2% active ingredient. This solution was used to rule the surface of white paper with lines about 0.5 mm. in thickness and 5 mm. apart. After drying, the paper bore no visible marking but when treated with a dilute solution of sodium hypochlorite a brown stain quickly developed and clearly showed the ruled lines.

When the triethanolamine used in the above procedure was replaced with monoethanolamine essentially identical results were obtained in the appearance of the solution and in its behavior toward the hypochlorite solution on the surface of paper. The monoethanolamine amounted to about 10.6 moles per mole of 2-amino-6-benzothiazolecarboxylic acid.

Similarly the triethanolamine was replaced with diethanolamine to provide about 6.1 moles of the alkanolamine per mole of the carboxylic acid, and similar results were obtained.

EXAMPLE 2

Forty parts by weight of the press cake of Example 1 were dissolved in 20 parts by weight of triethanolamine with heating to 70° C. to form a clear uniform solution which remained as such on cooling to room temperature. The solution on a weight basis contained 20% 2-amino-6-benzothiazolecarboxylic acid, 33% triethanolamine (2.1 moles per mole of carboxylic acid) and 47% water. This concentrated solution was diluted 1:10 with a 50% aqueous ethanol solution and brushed on the surface of paper. When the treated paper was dried and spotted with a dilute solution of sodium hypochlorite pronounced brown stains appeared.

The preceding representative examples may be varied within the scope of the present total specification disclosure, as understood and practiced by one skilled in the art to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention is which an exclusive property or privilege is claimed are as follows:

1. A composition of matter for rendering paper forgery-proof consisting essentially of a concentrated aqueous solution of 2-amino-6-benzothiazolecarboxylic acid and an alkanolamine, said composition being adapted to be diluted with a member selected from the group consisting of water, a lower aliphatic alcohol and a mixture of water and said alcohol, said alkanolamine having the formula $(HO-Alk)_x NR_{(3-x)}$ wherein Alk is an alkylene radical of two to four carbon atoms, R is selected from the group consisting of hydrogen and alkyl of one to three carbon atoms, and $x$ is an integer from one to three, said 2-amino-6-benzothiazolecarboxylic acid being present in an amount from 5% to 20% by weight of the entire solution and said alkanolamine being present in an amount sufficient to effect dissolution of the acid but not less than two moles per mole of the acid.

2. A composition of matter according to claim 1 wherein the alkanolamine is an ethanolamine.

3. A composition of matter according to claim 1 wherein the ethanolamine is triethanolamine.

4. A process of treating paper to render it forgery-proof which consists of diluting a composition according to claim 1 with a member selected from the group consisting of water, a lower aliphatic alcohol of one to three carbon atoms and a mixture of water and said alcohol, the dilution being such that the acid constitues a maximum of 2 weight percent of the diluted solution, and and applying the resultant solution to paper as a surface coating.

5. A process according to claim 4 wherein the resultant solution is printed onto said paper.

6. In a process for producing paper which is forgery-proof the step which comprises adding to the pulp prior to its conversion into paper the composition of claim 1 in an amount such that the pulp contains about 0.5 weight percent of the acid, based on dry pulp weight.

References Cited

UNITED STATES PATENTS 2,061,632   11/1936   Lenher _____ 117—1

S. LEON BASHORE, *Primary Examiner.*

U.S. Cl. X.R.

162—158; 117—1, 154; 252—408; 260—518